United States Patent [19]
Schwertfeger

[11] 3,707,905
[45] Jan. 2, 1973

[54] INTAKE AND EXHAUST SYSTEM FOR AUTOMATIC COFFEE BREWER

[75] Inventor: Owen J. Schwertfeger, Hartville, Mo.

[73] Assignee: The Seeburg Corporation of Delaware, Chicago, Ill.

[22] Filed: Oct. 21, 1971

[21] Appl. No.: 191,212

[52] U.S. Cl. .................................99/289, 99/302 P
[51] Int. Cl. ..............................................A23f 1/00
[58] Field of Search.........99/289 R, 282, 283, 289 T, 99/302 R, 302 P

[56] References Cited

UNITED STATES PATENTS

| | | | |
|---|---|---|---|
| 3,064,553 | 11/1962 | Simjian | 99/289 R |
| 3,120,440 | 2/1964 | Ross | 99/289 R |
| 3,203,340 | 8/1965 | Totten | 99/289 T |
| 3,662,675 | 5/1972 | Olland | 99/289 R |

Primary Examiner—Robert W. Jenkins
Attorney—Ronald L. Engel et al.

[57] ABSTRACT

A hollow vertically aligned manifold is provided in communication with the intake orifice of a brew chamber of an automatic coffee brewing machine. A partition divides the manifold into an intake chute and exhaust channel. The intake end of the exhaust channel is positioned immediately above the intake orifice of the brew chamber, and the opposite end of the exhaust channel is connected to an exhaust fan. Coffee and hot water when introduced into the intake chute flow into the intake orifice of the brew chamber, and steam and moist air emitted from the intake orifice of the brew chamber are exhausted through the exhaust channel.

6 Claims, 6 Drawing Figures

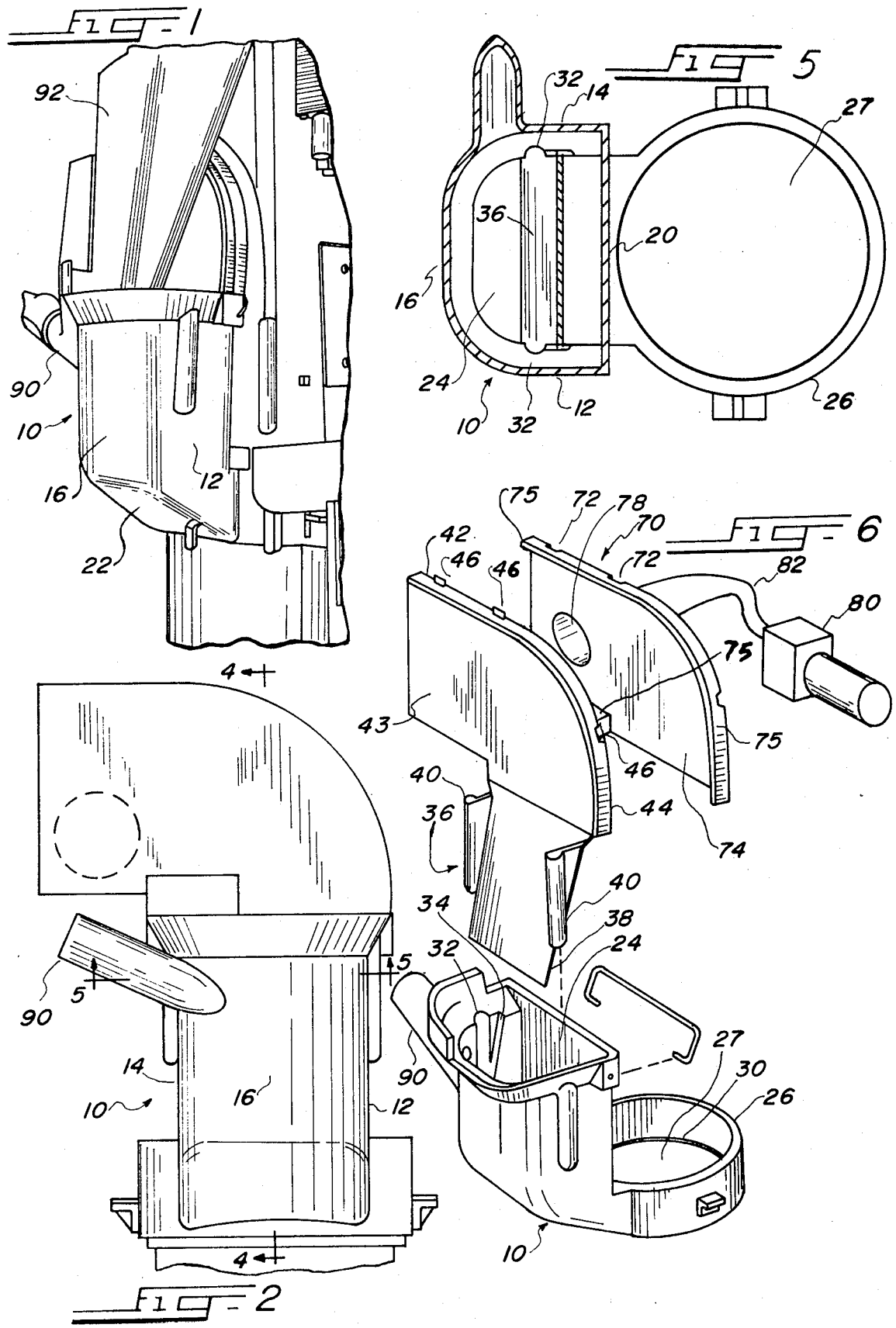

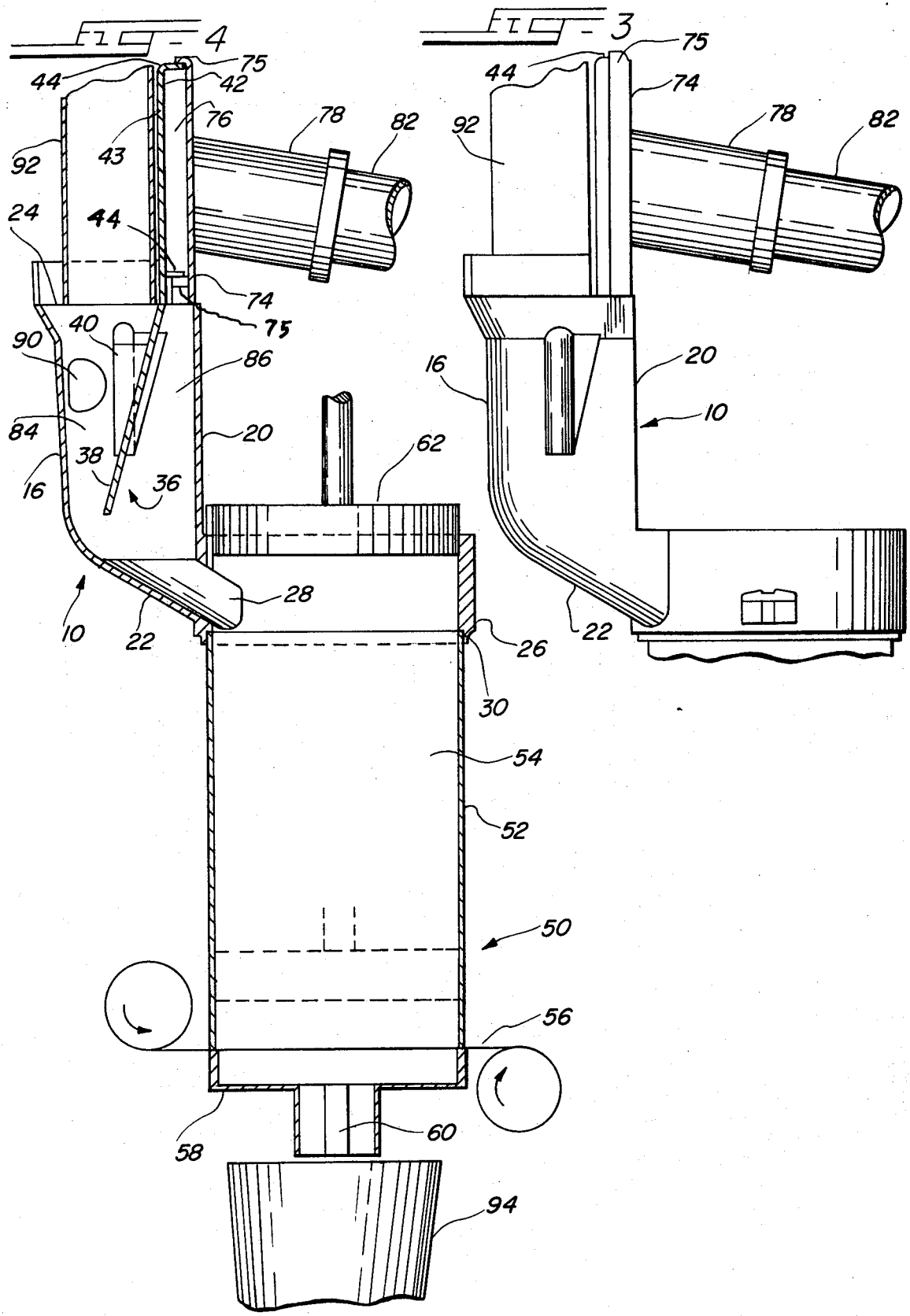

INTAKE AND EXHAUST SYSTEM FOR AUTOMATIC COFFEE BREWER

BACKGROUND OF THE INVENTION

1. Field of the Invention

The present invention relates to an intake and exhaust system, and more particularly to an intake and exhaust system for utilization with automatic coffee brewing machines.

2. Description of the Prior Art

Single cup automatic brewing machines are well known in the vending machine art and have been of particular commercial success by virtue of the obvious fresh brewed taste of the coffee purchased from such vending machines. For example, U. S. Pat. No. 3,203,340 — Totten discloses a typical commercially available single cup coffee brewing apparatus for utilization in a coin operated vending machine, and this dispensing mechanism is substantially the same as the coffee brewing and dispensing mechanism in conjunction with which the present invention is utilized.

The apparatus disclosed in U. S. Pat. No. 3,203,340 comprises a vertically aligned cylinder having a reciprocating piston positioned therein. Positioned at the bottom of the cylinder is a continuous filter strip which is held in position by a closure member having therein a downwardly disposed outlet. Ground coffee and hot water are introduced into an intake manifold around the intake orifice at the upper end of the cylinder. The piston thus forces the hot water through the ground coffee which is collected by the filter, and through the outlet in the closure into a cup positioned immediately below.

Several problems have been experienced in automatic coffee brewing and dispensing mechanisms theretofore known to the art. Typically, extremely hot water must be utilized in the brewing operation to assure a desirable end product. Consequently, the hot water produces a great deal of steam and moist air which is emitted from the intake orifice of the coffee brew chamber when the reciprocating piston is at an elevated position. The steam and moist air has a tendency to rise and condense upon colder surfaces in the vending machine. Since fresh ground coffee is normally stored in a coffee hopper above the intake orifice of the coffee brewing apparatus, the steam and moist air have a tendency to condense around the entrance of the coffee hopper, thus causing the dry coffee grounds to adhere to the surfaces of he coffee hopper and the apparatus. In addition, the presence of high concentrations of moist air and steam can cause contamination of the dry coffee grounds in the hopper thereby producing an unsanitary condition. Also, other dry ingredients such as sugar, tea, and powdered cream are stored in dispensers in the vending machine, and thus, it is desirable to exhaust moisture and steam to prevent caking and contamination of these ingredients. Exhaust systems for vending machines are well known to the art, however, such prior art exhaust systems have had the undesirable feature of also exhausting small quantities of the dry ingredients such as the smaller particles of ground coffee known as coffee "fines" and particles of tea if tea is also sold from the vending machine. Thus, over a period of time, the location around the vending machine becomes covered with a fine dust of dry ingredients, thus creating an unsanitary and unsightly situation. Consequently, it is important to provide a means whereby the steam and moist air can be exhausted as they are emitted from the intake orifice of the brew chamber to prevent condensation and contamination of the coffee in the coffee hopper and the other dry ingredients without exhausting the ingredients as well.

BRIEF SUMMARY OF THE INVENTION

To prevent the condensation of moisture on the upper surfaces of the intake manifold of an automatic coffee brewing dispensing apparatus and to prevent contamination of fresh ground coffee stored in the vending machine, an intake and exhaust system in accordance with the present invention was developed. The present invention substantially eliminates the disadvantages of the prior art intake manifolds by providing an exhaust channel which will exhaust steam and moisture before entering the intake channel without exhausting the dry ingredients.

In accordance with the present invention, an intake and exhaust system for an automatic coffee brewer of the reciprocating piston type comprising a vertically aligned cylindrical brew chamber having a reciprocating piston positioned therein and an intake orifice at the upper end thereof, comprises a hollow channeling means having a first open end in sealed communication with the intake orifice; a baffle means positioned within the channeling means to form a first intake channel and a second exhaust channel. The first intake channel channels the ground coffee from a coffee dispenser and hot water form a hot water source into the intake orifice of the brew chamber. The second exhaust channel exhausts moist air and steam emitted from the intake orifice before the steam and moist air can enter the first intake channel. The second exhaust channel has a first open end positioned immediately adjacent and above the intake orifice and a second open end in communication with an exhaust means. The exhaust means provides a vacuum exhaust for removing the moist air and steam emitted from the intake orifice.

By positioning the exhaust channel above the intake orifice, and forming a restricted area at the bottom of the intake channel, the hot water and ground coffee can be introduced into the brew chamber without being sucked into the exhaust channel. Further, the present invention is fabricated so that it may be easily disassembled for cleaning.

Thus, it is a primary object of the present invention to provide an intake and exhaust system for an automatic coffee brewer wherein an exhaust channel is provided to exhaust moist air and steam before the moist air and steam can enter the intake channel and cause spoilage or contamination of the ground coffee stored in the apparatus.

Another object of the present invention is to provide an intake and exhaust system for an automatic coffee brewer wherein the exhaust channel is positioned and formed in such a manner so that the moist air and steam are exhausted, without interference with the intake of hot water into the brew chamber and without exhausting the dry ingredients from the apparatus.

Yet another object of the present invention is to provide an intake and exhaust system for an automatic coffee brewer which is easily disassembled for cleaning.

3

These and other objects, advantages and features of the subject invention will hereinafter appear, and for the purpose of illustration, but not of limitation, exemplary embodiments of he present invention are illustrated in the accompanying drawings.

BRIEF DESCRIPTION OF THE DRAWINGS

FIG. 1 is a perspective view of a preferred embodiment of the present invention.

FIG. 2 is a front partially fragmentary view of the preferred embodiment of the present invention.

FIG. 3 is a side partially fragmentary view of the preferred embodiment of the present invention.

FIG. 4 is a cross sectional view taken substantially along line 4—4 in fIG. 2.

FIG. 5 is a cross sectional view taken substantially along line 5—5 in FIG. 2.

FIG. 6 is a perspective exploded view of the preferred embodiment of the present invention.

DETAILED DESCRIPTION OF THE PREFERRED EMBODIMENT

With reference to the drawings, hollow channeling means 10 comprises first side wall 12 and second side wall 14, curved front wall 16 and back wall 20 and bottom wall 22 integrally jointed to form hollow channeling means 10 having a first upwardly disposed open end 24. Integrally formed at the bottom of hollow channeling means 10 is annular ring 26. Formed within annular ring 26 at the point where annular ring 26 joins with bottom wall 22, back wall 20 and first and second side walls 12 and 14 is second horizontally disposed open end 28 (see FIG. 4).

Annular ring 26 is generally cylindrical having a circular hollow cavity 27 with upper and lower open ends. Formed around the bottom edge of annular ring 26 is annular indentation 30 adapted to receive and engage with cylinder 52 of coffee brew chamber assembly 50. Annular ring 26 has an inside diameter which is the same as the inside diameter of cylinder 52 so that when annular ring 26 is placed on cylinder 52 a continuous hollow opening 54 within cylinder 52 and annular ring 26 is formed.

Coffee brew chamber assembly 50 is a conventional reciprocating piston type automatic coffee brewer generally of the type illustrated and described in U. S. Pat. NO. 3,203,340 — Totten. Generally, coffee brew chamber assembly 50 comprises cylinder 52 in vertical alignment, continuous filter material 56 positioned over the lower open end of cylinder 52 and bottom member 58 positioned over continuous filter material 56 to seal the lower open end cylinder 52. Bottom member 58 has formed in approximately the center thereof an orifice 60 which communicates with cylindrical opening 54. Positioned within cylindrical opening 54 is piston 62 which is adapted and dimensioned to slide vertically through cylindrical opening 54.

Formed in the first and second side walls 12 and 14 of hollow channeling means 10 are vertical baffle grooves 32 and diagonal baffle grooves 34. Vertical baffle grooves 32 and diagonal baffle grooves 34 are dimensioned to accept and position baffle member 35 within hollow channeling means 10. Baffle member 36 comprises essentially flat divider panel 38 to which aligning flanges 40 are integrally formed. Aligning flanges 40 are dimensioned and adapted to slidably mate with vertical baffle groove 32 and diagonal baffle groove 34 to align baffle member 36 within hollow channeling means 10.

Integrally joined to the upper edge of divider panel 38 is first exhaust channel wall assembly 42. First exhaust wall assembly 42 comprises flat wall 43 and flanges 44 integrally molded perpendicularly to the top and bottom edges thereof. Formed in flange 44 are protrusions 46 which are adapted and dimensioned to engage in openings 72 in second exhaust wall assembly 70.

Second exhaust wall assembly 70 comprises flat wall 74 and flanges 75 integrally molded perpendicularly to the top and bottom edges thereof. Flanges 75 are dimensioned to fit around flanges 44 on first exhaust wall assembly 42 so that protrusions 46 will engage with openings 72. In this position, first exhaust wall assembly 42 and second exhaust wall assembly 70 form a hollow exhaust channel 76 (see FIG. 4). Communicating with hollow exhaust channel 76 is hollow exhaust conduit 78 which is connected to a vacuum exhaust pump 80 by a connecting conduit 82. Exhaust channel 76 is open at the end adjacent conduit 78 so that exhaust pump 80 does not create sufficient vacuum to exhaust the water and coffee up the exhaust channel 76.

When first and second exhaust wall assemblies 42 and 70 are joined and baffle member 36 is inserted into baffle grooves 32 and 34, divider panel 38 divides hollow channeling means 10 into a first intake channel 84 and a second exhaust channel 86 (see FIG. 4). Second exhaust channel 86 is in sealed communication with exhaust channel 76, and thus, when vacuum exhaust pump 80 is operated, air is drawn through second exhaust channel 86, exhaust channel 76, exhaust conduit 78, and connecting conduit 82.

INtegrally formed in curved front wall 16 of hollow channeling means 10 in communication with first intake channel 84 is hot water intake conduit 90. Hot water intake conduit 90 is connected to a hot water source (not shown) which provides a predetermined volume of hot water during the vending operation. Positioned immediately above first open end 24 of hollow channeling means 10 in communication with first intake channel 84 is coffee hopper chute 92. Coffee hopper chute 92 is connected to a coffee storage and dispensing apparatus (not shown) which dispenses measured amounts of dry coffee ground into coffee hopper chute 92 when a purchase is made.

The automatic coffee brewer in connection with which the subject invention is utilized, is a conventional coin operated coffee dispenser (not shown) adapted for operation in response to insertion of the appropriate denomination of coins into the machine. Also not shown are the coffee cup dispensing mechanism which aligns a plastic or cardboard coffee cup 94 immediately below orifice 60 in bottom member 58 of coffee brew chamber assembly 50 when a purchase is made.

Operation of the intake and exhaust system for an automatic coffee brewer is substantially as follows. In response to the insertion of an appropriate denomination of coins by a purchaser, a measured amount of coffee grounds is dispensed into coffee hopper chute 92 which falls by gravity into first intake channel 84. The tapering of first intake channel 84 because of the angular placement of divider panel 38 causes the air being sucked into he first intake channel 84 and the dry coffee grounds falling down first intake channel 84 to accelerate until they pass the lower end of divider panel 38. Once past divider panel 38 the area expands and the velocity of the air and ground coffee decelerates. This deceleration allows gravity and inertia to tend to hold the coffee grounds and coffee "fines" against bottom wall 22, and thus, eliminates the tendency of exhaust pump 80 to exhaust the ground coffee and coffee "fines" up second exhaust channel 86. Thus, the angular placement of divider panel 38 in channeling means 10 is an important feature of the preset invention and helps to prevent the exhaustion of the ground coffee and coffee "fines" from the system. Hot water is then introduced through hot water intake conduit 94 into first intake channel 84. The hot water travels down first intake channel 84 below the the lower end of second exhaust channel 86 through second open end 28 of hollow channeling means 10 into cylindrical opening 54. Any steam or moist air from the hot water introduced is exhausted by vacuum exhaust pump 80 through second exhaust channel 86, exhaust channel 76, exhaust conduit 78, and connecting conduit 82. Once the coffee and hot water are in cylindrical opening 54, piston 62 moves downward through cylindrical opening 54 to force the hot water through the ground coffee which has collected on continuous filter material 56. In this manner, fresh liquid coffee is brewed, and the liquid coffee is forced out orifice 60 into coffee cup 94. Upon completion of the brewing operation, piston 62 returns to an elevated position, and bottom member 58 disengages from cylinder 52 so that the continuous filter material 56 can be moved laterally to remove the used coffee grounds, and position a fresh section of continuous filter material 56 over the lower open end of cylinder 52. The used coffee grounds are collected in an appropriate waste receptacle (not shown) in the vending machine.

When piston 62 returns to its upper position (as illustrated by the solid lines in fIG. 4), second open end 28 is opened to cylindrical opening 54, and steam and moist air resulting from the brewing operation can escape into hollow channeling means 10. However, vacuum exhaust pump 80 exhausts the moist air and steam escaping from second open end 28 before the moist air and steam can enter first intake channel 84. Thus, moist air and steam generated by the brewing process are prevented from traveling back up first intake channel 84 and condensing on coffee hopper chute 92 or contaminating the coffee in the coffee hopper.

By positioning second exhaust channel 86 immediately above second open end 28 and by tapering first intake channel 84 to a more restricted portion at the lower end of divider panel 38 so that the hot water and ground coffee flow into second open end 28 along bottom wall 22, the possibility of the hot water and coffee grounds being drawn into the exhaust system is eliminated. However, this arrangement has not affected the ability of the exhaust pump 80 from exhausting the moist air and steam from the system.

An additional advantage of the present invention is that it can easily be disassembled for cleaning. Annular ring 26 is easily disengaged from cylinder 52, and connecting conduit 82 can be disengaged from exhaust conduit 78 so that the first and second exhaust wall assemblies 42 and baffle member 36 can be removed from hollow channeling means 10. The entire intake and exhaust system can then be easily cleaned and reassembled for operation. However, the present invention reduces the frequency of necessary cleaning since the system tends to stay cleaner. Thus, by exhausting the moist air and steam, the entire system is far more sanitary and safe for the consuming public.

It should also be understood that various changes, modifications, variations in the structure and function of the present invention may be affected without departing from the spirit and scope of he present invention as defined in the appended claims.

I claim:

1. An intake and exhaust system for an automatic coffee brewer, the brewer having an intake orifice for admitting ground coffee from a coffee dispenser and hot water from a hot water source comprising:

hollow channeling means having a first open end in communication with the intake orifice;

baffle means positioned within said channeling means, said baffle means forming within said channeling means an intake channel and an exhaust channel, said intake channel channeling ground coffee from the coffee dispenser and hot water from the hot water source into said intake orifice;

first and second open ends in said exhaust channel, said first end positioned immediately adjacent and above said intake orifice;

exhaust means in communication with said second end of said exhaust channel for providing a vacuum exhaust to said exhaust channel so that moist air and steam emitted from the intake orifice is exhausted away from said intake channel thereby preventing said moist air and steam from entering said intake channel and contacting the ground coffee in the dispenser.

2. An intake and exhaust system as claimed in claim 1 wherein said hollow channeling means comprises a hollow intake manifold including an upwardly disposed second open end, a horizontally disposed first open end in sealed communication with the intake orifice, and baffle grooves formed in opposite sides of said hollow channeling means the upper ends of said baffle grooves being open to the second open end.

3. An intake and exhaust system as claimed in claim 2, wherein said baffle means comprises:

a separator member dimensioned to slide into said baffle grooves to form said intake channel and said exhaust channel within said hollow intake manifold, said separator member positioned so that said intake channel tapers to a narrower portion at the bottom thereof;

an exhaust conduit attached to the upper end of said separator member, said exhaust conduit formed to sealably communicate at a first end of said exhaust channel and the second end of said exhaust conduit being operably connected to said exhaust means.

4. In an automatic coffee vendor, said vender comprising a vertically aligned cylinder, a reciprocating piston in said cylinder, an intake orifice to permit intake of coffee and hot water from a coffee dispenser and a hot water source when said piston is at the upper limit of its travel, a filter for straining out coffee grounds positioned at the lower end of said cylinder, a lower closure member positioned over the bottom of said cylinder said closure member having an opening therein to permit the flow of brewed liquid coffee from said cylinder in response to downward travel of said piston; an improved intake and exhaust system comprising:

a hollow manifold in communication with said intake orifice, said manifold including a baffle means positioned within said hollow intake manifold forming an intake channel and an exhaust channel within said hollow intake manifold, said intake channel for channeling ground coffee dispensed by the coffee dispenser, and hot water introduced by the hot water source into the intake orifice, and said exhaust channel being positioned immediately adjacent and above said intake orifice;

exhaust means in communication with said exhaust channel for exhausting moist air and steam emitted from the intake orifice through said exhaust channel.

5. An intake and exhaust system as claimed in claim 4 wherein said hollow manifold comprises:

first, second, third and fourth walls joined along vertical edges to form a hollow member with an upwardly disposed first open end;

a first bottom wall joined to the lower edges of the first, second and third side walls so that a horizontally facing lower second open end is defined between the first bottom wall and the fourth side wall; and baffle grooves formed in the first and third side walls.

6. An intake and exhaust system as claimed in claim 5 wherein said baffle means comprises:

a flat separator member dimensioned to fit into the baffle grooves to divide said hollow member into said intake channel and said exhaust channel, said separator member being positioned at an angle in said hollow manifold so that said intake channel is tapered to a narrower portion at the bottom thereof, and said separator member extending from immediately adjacent and above the lower second open end to the upper first open end;

an exhaust conduit attached to the upper end of said separator, said exhaust conduit having a first open end in sealed communication with said exhaust channel and a second open end operably communicating with the exhaust means.

* * * * *